United States Patent [19]

Gradnitzer et al.

[11] Patent Number: 4,682,263
[45] Date of Patent: Jul. 21, 1987

[54] ELECTRICAL SHORT-CICRUIT MONITORING ARRANGEMENT FOR VARIABLE-SPEED, THREE-PHASE MOTORS, INCLUDING THEIR FEED LINES

[75] Inventors: Eckhard Gradnitzer, Zirndorf, Austria; Herwig Klautschek, Fuerth, Fed. Rep. of Germany

[73] Assignee: Siemens Aktiengesellschaft, Berlin and Munich, Fed. Rep. of Germany

[21] Appl. No.: 798,266

[22] Filed: Nov. 15, 1985

[30] Foreign Application Priority Data

Nov. 23, 1984 [DE] Fed. Rep. of Germany ....... 3442827

[51] Int. Cl.$^4$ ............................................. H02H 7/08
[52] U.S. Cl. ....................................... 361/31; 361/23; 361/28
[58] Field of Search ........................ 361/23, 28, 31, 33

[56] References Cited

U.S. PATENT DOCUMENTS

| 3,662,182 | 5/1972 | Ullmann et al. | 307/64 |
| 3,824,430 | 7/1974 | Hentschel | 361/23 |
| 3,919,600 | 11/1975 | Son | 361/28 X |
| 4,133,413 | 1/1979 | Watanabe | 187/29 |
| 4,340,920 | 7/1982 | Gill et al. | 361/49 |
| 4,439,806 | 3/1984 | Braider | 361/31 X |

FOREIGN PATENT DOCUMENTS

| 3442607 | 6/1985 | Fed. Rep. of Germany | 361/23 |
| 2047021A | 11/1980 | United Kingdom . | |
| 1117762 | 10/1984 | U.S.S.R. | 361/23 |

Primary Examiner—Roy N. Envall, Jr.
Assistant Examiner—Jeffrey A. Gaffin
Attorney, Agent, or Firm—Volker R. Ulbrich; Jack Penrod

[57] ABSTRACT

An electrical short-circuit monitoring arrangement for a three-phase motor, including its supply lines, whose speed is controlled by a constant-current d.c.-link converter. The harmonic ripple voltage superimposed on the motor voltage generated as a consequence of the commutation by the constant-current d.c.-link converter at the output of the converter is determined, filtered, and supplied to a phase-monitoring unit, which when dropping below a selected amplitude variable of the harmonic voltage of at least one phase, triggers the switching module whose switching mechanism activates a disconnect switch to interrupt the motor circuit upon occurrence of a switchoff signal.

7 Claims, 2 Drawing Figures

ELECTRICAL SHORT-CICRUIT MONITORING ARRANGEMENT FOR VARIABLE-SPEED, THREE-PHASE MOTORS, INCLUDING THEIR FEED LINES

BACKGROUND OF THE INVENTION

This invention relates to electrical safety circuits and more particularly to a short-circuit monitoring circuit for a three-phase, variable speed motor, and the supply lines that connect the motor to a constant-current, d.c. link converter for varying the rotational speed.

Electrical short-circuit monitoring arrangements of the above-specified type are particularly significant in pit-mining operations. Due to the danger of overheating and thus possible explosion in the event of short circuits during an otherwise explosion-proof operation in mines, it is necessary to monitor not only the motor, e.g., by means of a motor circuit breaker, but also its supply lines in the potentially explosive areas. The monitoring itself should take place outside this area because otherwise the monitoring system itself would also have to be designed also in an explosion-proof fashion. In addition, monitoring the supply lines is even more important than monitoring the motor since the latter has a thermal overload protection device. Underground mining therefore requires that a power line carrying a short-circuit current has to be separated from the supply system within 100 ms. Generally, this objective is attained in constant-current d.c.-link converters of the above type by monitoring the magnetic flux of the connected motor which, as a rule, is integral to the system. Said monitoring, however, only begins to operate at frequencies exceeding 5–7 Hz.

This corresponds to a motor rpm of approximately 10% of the rated rpm in 50-Hz systems. In the range between 0 and 10% therefore the lines between the converter and the motor, and to the motor itself, remain unmonitored for short-circuits. Neither can a power measurement be used as a monitoring criterion, since due to the always prevailing current-limiting circuit in the converter control circuit, the monitoring would not be able to differentiate whether the excess current was due to overload or a short-circuit.

It is the object of this invention to develop a fully functional short-circuit monitoring circuit that operates in the 0 to 10% range of the no-load rpm, as well as in the rest of the range.

SUMMARY OF THE INVENTION

Briefly stated in accordance with one aspect of the invention, the aforementioned object is achieved by providing an electrical short-circuit monitoring circuit for a variable speed three-phase motor and supply lines thereto having a constant-current, d.c.-link converter with a line-commuted, system-end, thyristor converter, an intermediate reactance circuit, and a self-commmuting, machine-end converter. The electrical short circuit monitoring circuit is characterized by having a ripple voltage generated as a consequence of commutation by the constant-current, dc.-link converter and superimposed upon a motor voltage at an output of the d.c.-link converter. The voltage is determined, filtered and supplied to a phase monitoring unit for monitoring each magnitude level of the ripple voltage supplied to each of the three motor phases. Each of the ripple voltage magnitude levels are compared to an adjustable amplitude reference of the ripple voltage for generating a switch-off signal upon an occurrence in any phase. The switch-off signal triggers a switch module with switching means for actuating a disconnect switch to interrupt the power connection to the three-phase motor.

A short-circuit on the motor side of a constant-current d.c.-link converter, particularly in the operating range of 0 to 15 Hz, can be detected by measurement and utilized as a control variable to interrupt power to the short circuit. The short-circuit criterion utilized is the current ripple of the constant-current d.c.-link converter, which in the full-wave, three-phase circuit of the associated power converter occurs with 6 times the system frequency, thereby generating a corresponding ripple voltage. This ripple voltage arises in the leakage reactance of the motor and converter link. The ripple voltage drops to zero in the event of a short-circuit. Since the ripple voltage occurs in all three phases, one can also determine in which phase the short-circuit occurred.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
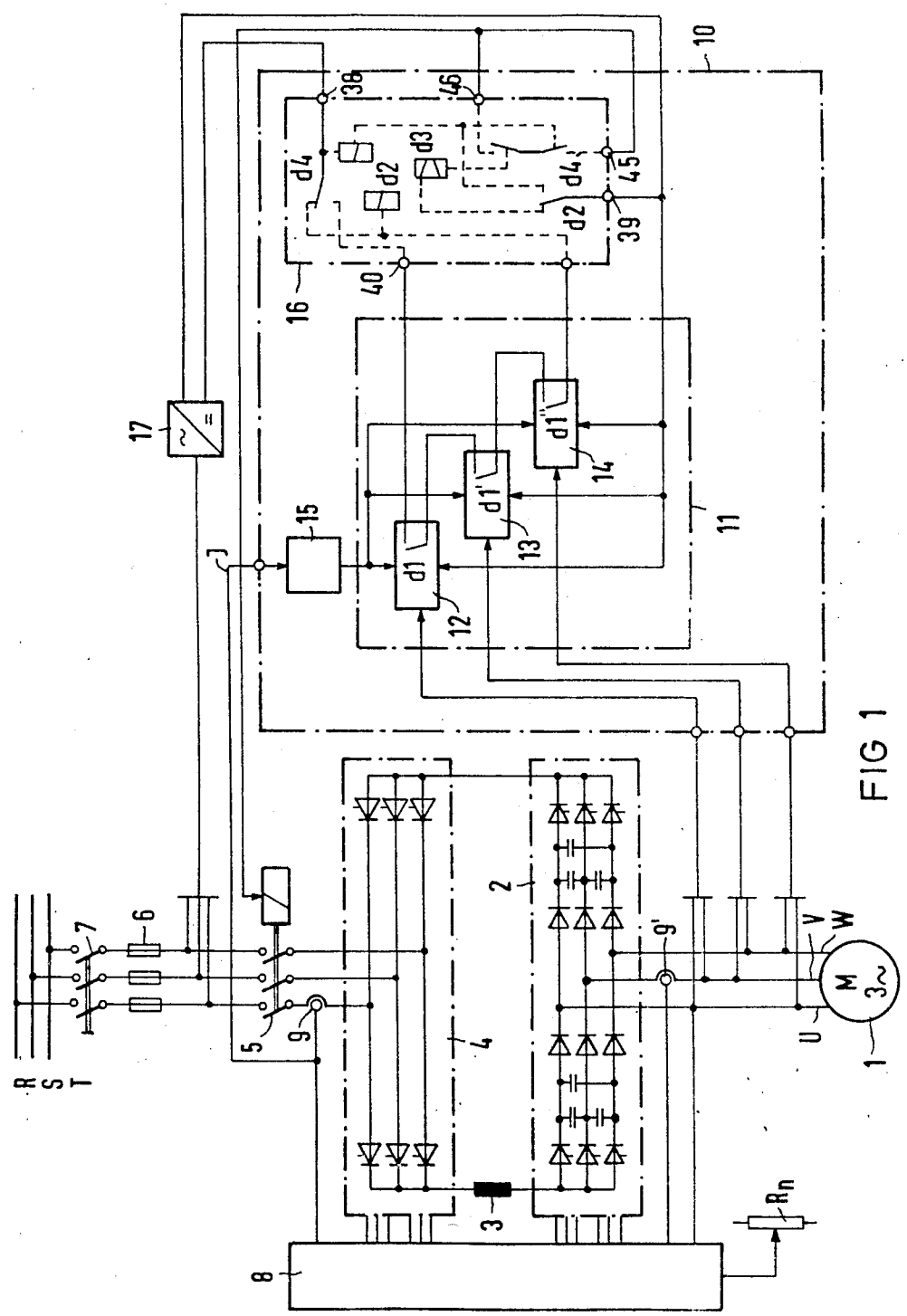
FIG. 1 is a schematic diagram of the motor circuit with the constant-current d.c.-link converter as well as the short-circuit monitoring circuit and switching mechanisms within the motor circuit.

In accordance with FIG. 1, the three-phase motor 1 is connected by supply lines U, V, W to the output of the constant-current d.c.-link converter, which consists of a self-commutating machine-end converter 2, an intermediate circuit reactance coil 3, and a system-commutated system-end thyristor power converter 4 in a B6 circuit. Its input terminals are connected to the RST three-phase current system using a disconnect switch 5, fuses 6 and main switch 7. The speed control of motor 1 is handled in the known fashion by a preset value at the potentiometer $R_n$ by means of the control circuit 8, based upon the input current value measured by the current transformer 9 and the output current value measured by the current transformer 9 as well as the value formed by the magnetic working flux generated by the latter and by the output voltage. Based upon these values, the thyristors of the system-end and the converter on the machine-end are affected in such a fashion by the control circuit 8 by means of the phase angle control of the system-end converter 4 and the commutation control of the machine-end converter 2 that the desired rpm is attained.

The electronic commutation, as described, for example, in "Power System-Commutated Converters" by Moeltken, 1983, under 2, pages 15 and following, produces a current ripple which generates a correspondingly harmonic voltage in the motor leakage reactance, which attains a frequency of 300 Hz, given the rectifier circuit shown and a system frequency of 50 Hz. This harmonic voltage arises in all three phases of the motor circuit.

As said harmonic voltage arises in the motor leakage reactance on the output side, it collapses in case of a short-circuit either in the motor supply lines or in the motor winding.

The idea underlying the invention is to make use of this harmonic voltage characteristic by means of the arrangement described below in order to monitor short-circuits.

As shown in FIG. 1 the short-circuit monitoring arrangement 10 consist of a phase monitoring unit 11 with one phase monitoring element 12, 13, 14 each for individual monitoring of phases U-V, V-W and U-W; a release module 15 and a switching module 16. Each of the phase monitoring elements 12, 13, 14 is connected to a respective relay switch d1, d1' or d1", all of which are connected in series through switching module 16. As long as all contacts are closed, the disconnect switch 5 is not actuated so that its contacts are closed as well. In case one of the relay contacts d1, d1' or d1", opens, e.g., due to a short-circuit in one of the motor phases, as will be described, then the exciter circuit of switching module 16 and of disconnect switch 5 of switching module 16 is also interrupted so that the disconnect switch 5 opens its contacts and disconnects the converter-motor unit from the RST system. The monitoring arrangement 10 is supplied via system component 17.

Figure 2:
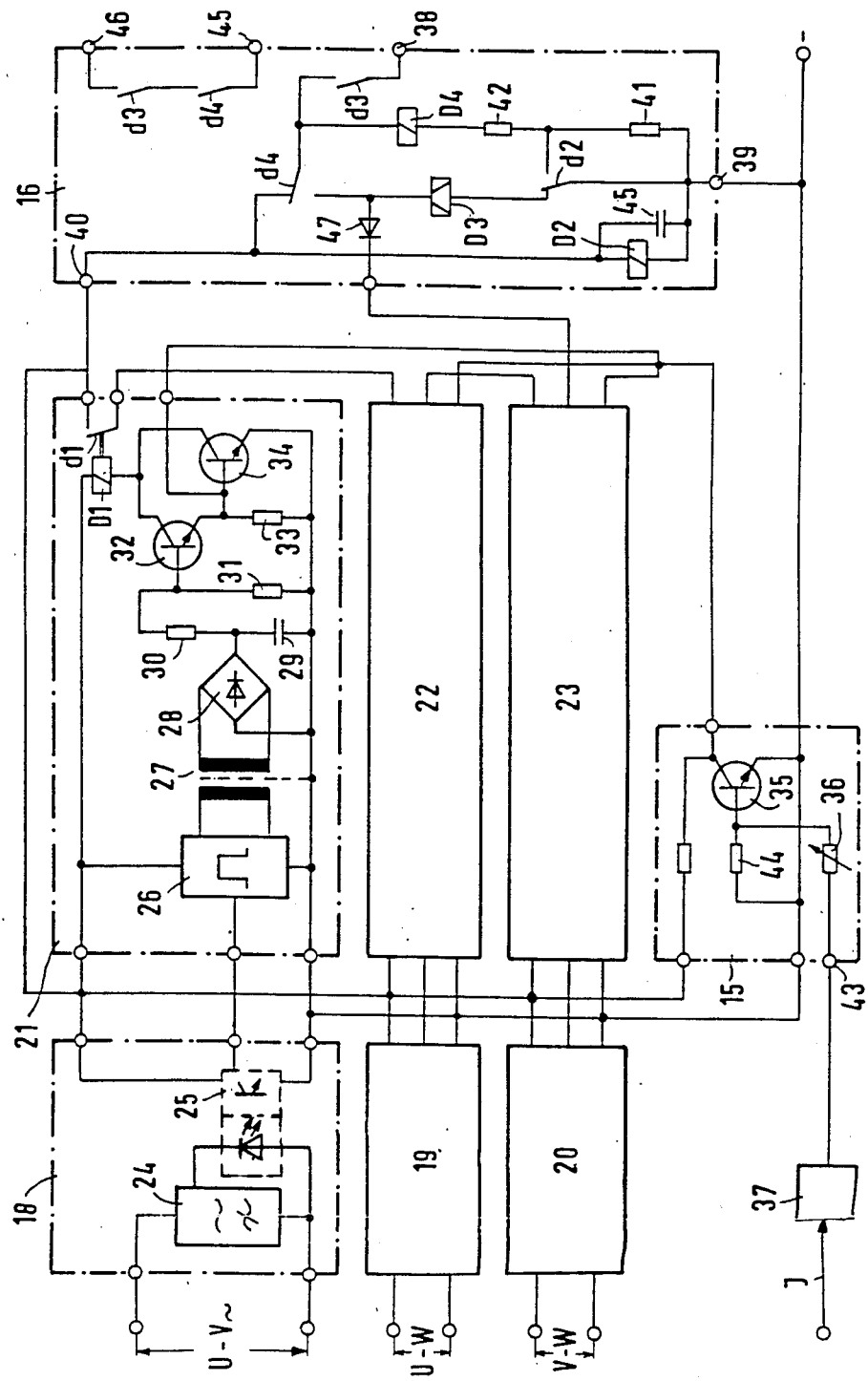
FIG. 2 is a schematic of the monitoring circuit detailing the phase monitoring unit, the release module and the switching module.

Based upon the schematic of the phase monitoring unit 12 shown in FIG. 2 as well as the release module 15 and switching module 16, the functioning of the monitoring arrangement will be described as follows.

Each of the phase monitoring elements 12, 13, 14 shown in FIG. 1, consists of a matching and decoupling stage 18, 19, or 20, each in turn connected to a respective evaluating electronic component 21, 22, or 23. Since the phase monitoring elements of all three channels are designed identically, the FIG. 2 schematic simply depicts the phase monitoring element of phase channel U-V with the matching and decoupling stage 18 as well as their evaluating electronic component 21. Consequently, after switching on the unit by activating the power switch, the phase voltage (U-V, V-W and U-W) initially reaches the relevant high pass filter 24, which filters out the harmonic voltage and supplies it to an optoisolater 25. The sensory signal obtained in this fashion, which is proportional to the harmonic voltage and electrically isolated from the power component, is passed to the input of the evaluating electronic component 21 in which it passes from a pulse-forming stage 26 to a transformer 27, which by means of a smoothing RC element 29, 30 converts the sensory signal to a control d.c. voltage signal and divides it with the base resistor 31 of a monitoring swtiching transistor 32. The channel relay $D_1$ and the emitter resistance 33 of a release switching transistor 34 are located in the collector-emitter circuit of this transistor. The base of said transistor 34 is connected to the release module 15, which incorporates a switching transistor 35, whose base is connected over a variable resistance 36, as well as a matching element 37, to the current transformer 9 (see FIG. 1) supply current, J.

Once the system is placed in operation by actuation of the main switch 7, then voltage passes over system component 17 to the input terminals 38, 39 of switching module 16. Simultaneously, the phase monitoring unit 11 (FIG. 1) receives positive voltage over closed contact $d_3$ of a not yet excited switchoff relay $D_3$, which is designed as a magnetic latching relay with a mechanical reset, as well as over the changeover contact $d_4$ of output terminal 40 of the switching module 16 in the position as shown. The negative voltage passes over terminal 39 of switching module 16 to relay $D_2$, the common pole of its changeover contact $d_2$ and a series resistance 41 of relay $D_4$. Said resistance and a further resistance 42 connected in series to it are of a resistance value so that said relay initially cannot attract. In accordance with the motor current measured by current transformer 9, a control variable generated by matching stage 37 is conducted to terminal 43 and over a variable resistance 36 to the base of switching transistor 35. Before attaining a specified bias voltage at base resistance 44, switching transistor 35 is cut off. Thereby the base of release switching transistor 34 becomes positive so that said transistor conducts and relay $D_1$ attracts. As soon as the motor current has exceeded a specified threshold value, which can be set by resistance 36, switching transistor 35 becomes conductive so that the voltage at the base of release switching transistor 34 drops down to the level at which relay $D_1$ would drop out unless transistors 32, 34 are simultaneously advanced by the harmonic voltage which arose in the meantime. The circuit is thus "adapted." The adaption point is selected so that it is always attained by the magnetizing current of the idling motor. When connecting the voltage, relay $D_2$ is also pulled up and a capacitor 45 in parallel to the relay is charged so that the relay is secured against any voltage drops in case of short-term power interruptions due to the switching operation of changeover contact $d_4$. By pulling in relay $D_2$, its changeover contact $d_4$ passes from the position shown into the opposite direction and thereby short-circuits resistance 41 so that now relay $D_4$ can also pull in and close its contact $d_4$. Switchoff relay $D_3$, however, remains separated from the voltage supply by diode 47. When relay $D_4$ pulls in, however, its changeover contact $d_4$ also passes from the shown position into the reverse position so that changeover relay $D_3$ is now also ready for switchoff. Due to the now closed NO contact $d_4$ and the still closed NC contact $d_3$, disconnect switch 5 can be switched "ON" over terminals 45, 46 of switching module 16. Thus system voltage is supplied to the constant-current d.c.-link converter 2, 3, 4, 8 so that motor 1 is placed in operation. Contact $d_4$ ensures that if the supply voltage is not present or no longer present at terminals 38, 39, motor 1 cannot be switched on or is switched off. After the motor circuit is in operation, the harmonic voltage of all three phases prevails at the corresponding inputs of the matching and decoupling stages 18, 19, 20, which generate a control voltage therefrom. Said control voltage passing over a pulse forming stage 26 and transformer 27 with rectifier 28 drops off as d.c. voltage at resistance 31 and thereby arises at the base of switching transistor 32 so that said transistor and transistor 34 become conductive, relay $D_1$ is excited and its contact $d_1$ remains closed. Due to the identical function of all monitoring elements, contact $d_1$ prime and contact $d_1"$ are also closed, assuming that harmonic voltage arose in the relevant phases. Thereby, all phase monitoring elements even after activating changeover contact $d_4$ remain charged over the closed contacts $d_1$, $d_1'$ and $d_1"$.

The monitoring arrangement has thus attained a steady state which characterizes the normal condition. If now a short-circuit arises in one of the phases of the motor circuit, then the harmonic voltage in the relevant phase collapses. As a result, the base voltage of switching transistor 32 drops to zero and the transistor cuts off. Thereby relay $D_1$ also drops out and opens its associated contact $d_1$. Simultaneously the voltage at terminal 40 of the switching module collapses so that relay $D_2$ drops out. Thus, its changeover contact $d_2$ returns to the indicated position so that switchoff relay $D_3$ is excited and pulls in. In this context the rating of the resistance 41 is selected so that relay $D_4$, despite the release of said resistance, remains pulled in by $d_4$. By opening contact $d_3$ the exciter coil circuit of the disconnect switch 5 connected to terminals 45, 46 of the switching module is opened and interrupts the primary motor circuit.

As switchoff relay $D_3$ has a mechanical reset, the system cannot be placed back into operation until said resetting has been manually performed so that any restart of the motor is not possible until the malfunctioning has been acknowledged by a local operator.

Due to the series circuitry of contacts $d_1$, $d_1'$ and $d_1''$, the switchoff takes place in any case, regardless of whether the short-circuit arises in one, two or all phases.

Due to the fact that the system is ready for operation only when relay $D_1$ is pulled in, the entire circuit, except switching transistors 32 and 34, is self-monitoring, i.e., in case any malfunction reaches said transistors, the motor circuit is interrupted. A further advantage is that in case of a malfunction and the resulting opening of one of the contacts $d_1$ and the correspondingly activation of switchoff relay $D_3$ by its opening NC contact $d_3$, the supply voltage is simultaneously disconnected from the monitoring unit. By this separation of the monitoring arrangement from the power system in the event of a malfunction, any reactions on the monitoring system due to undefined oscillation of the converter output voltge as could arise at the moment of switchoff, are eliminated. A further advantage is that the arrangement can only be adapted by the release module once a certain minimal current flows. This is of significance since the harmonic voltage only arises at a minimum motor current value. If this minimum current is not attained, the arrangement is automatically blocked. This provides a maximum guarantee against spurious switchoffs.

It will now be understood that there has been disclosed an improved short circuit monitoring circuit that operates at all motor speeds. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. An electric short-circuit monitoring circuit for a variable speed three-phase motor and the supply lines thereto, said circuit being of the type having a constant-current, d.c.-link converter with a line-commuted system-end thyristor converter, an intermediate reactance circuit, and a self-commuting machine-end converter, said monitoring circuit comprising:
    means for monitoring the magnitude level of a ripple voltage superimposed on an output of said d.c.-link converter as a consequence of motor voltage commutation and supplied to each of the three motor phases connected to the output;
    means for filtering the ripple voltages to obtain harmonic frequency voltages thereof;
    means for comparing the harmonic frequency ripple voltage magnitude level for each of the phases to a preset reference voltage amplitude;
    means for generating an interrupt signal in the event that the magnitude of any one of the harmonic frequency ripple voltage levels falls below the preset voltage amplitude reference and
    means for interrupting the power supply to the motor in response to the interrupt signal.

2. The circuit according to claim 1, wherein:
    said monitoring means comprises a plurality of phase monitoring elements, each associated with one phase of said motor and having a system-end connected output and decoupling stage and comprising
    an element for filtering out the ripple voltage, and
    a plurality of electronic evaluating stages, each connected to a respective phase monitoring element with a module for releasing each said evaluating stage when a present motor current is exceeded and for supplying a signal to the switching module to interrupt the motor circuit when the ripple current drops below a preset value.

3. A circuit according to claim 2, further characterized by, each evaluating stage having connected to its output a monitoring relay which during the presence of the ripple voltage is triggered and drops out if the ripple voltage fails or decreases due to a malfunction of a power supply component, and having a plurality of contacts of the monitoring relays of all the evaluating stages connected in series and connected also to the switching module, such that when a pair of monitoring relay contacts opens, a switching mechanism of the module acts to interrupt the motor circuit.

4. A circuit according to claim 3, further characterized by having the interrupting means interrupt the power supply to the monitoring means for a period of the interruption after an interrupt signal is generated.

5. A circuit according to claim 4, wherein said interrupting means comprises a magnetic latching relay with a mechanical reset as the switching mechanism.

6. A circuit according to claim 2, further characterized by having the interrupting means interrupt the power supply to the monitoring means for a period of the interruption after an interrupt signal is generated.

7. A circuit according to claim 1, further characterized by having means which interrupt the power supply to the monitoring means for a period of the interruption after an interrupt signal is generated.

* * * * *